May 6, 1969  T. P. FOLEY  3,442,125
FLUID FLOW MEASURING DEVICE
Filed May 3, 1967  Sheet 1 of 2
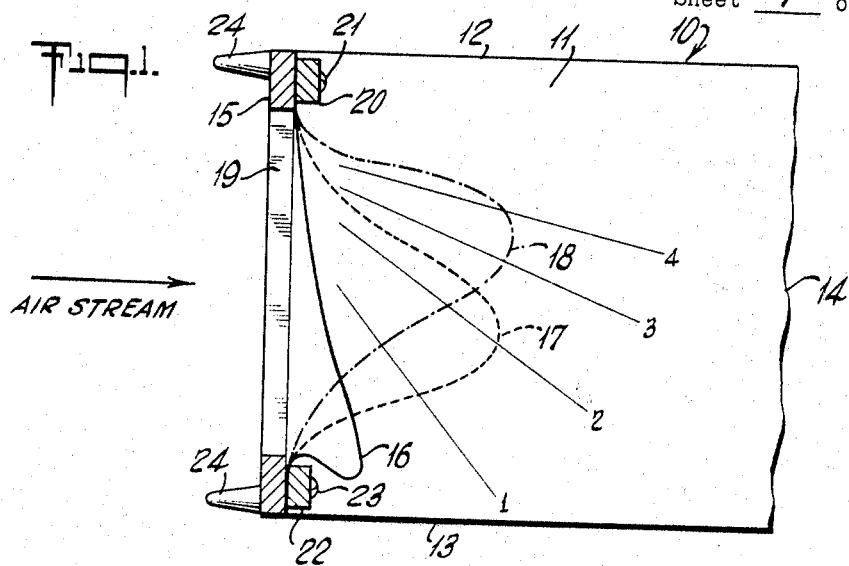
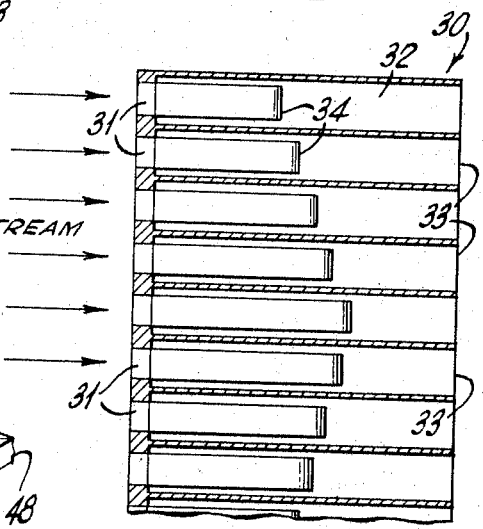
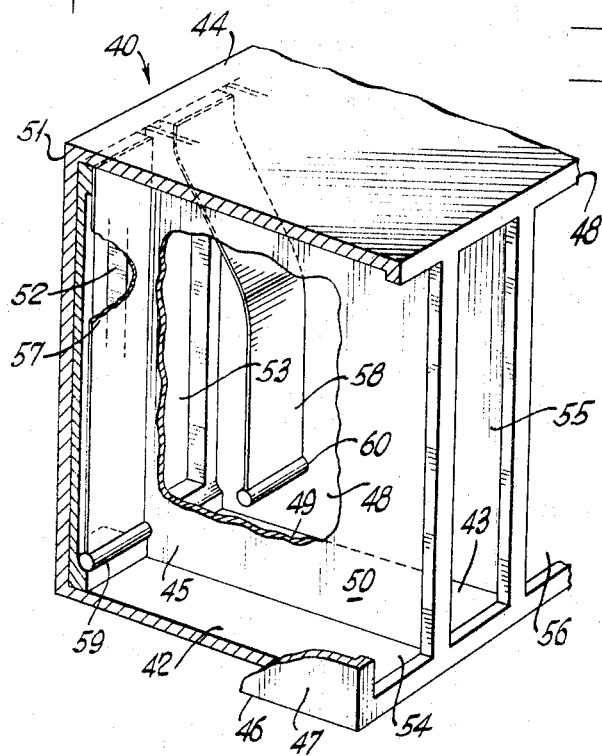
INVENTOR
THOMAS P. FOLEY

INVENTOR
THOMAS P. FOLEY

# United States Patent Office 3,442,125
Patented May 6, 1969

3,442,125
FLUID FLOW MEASURING DEVICE
Thomas P. Foley, Huntington, N.Y., assignor to Potter Instrument Company, Inc., Plainview, N.Y., a corporation of New York
Filed May 3, 1967, Ser. No. 635,798
Int. Cl. G01f 1/06
U.S. Cl. 73—228    4 Claims

ABSTRACT OF THE DISCLOSURE

This tape anemometer has one or more cells or passageways, each with a weighted tape strip or streamer attached at the top to hang by gravity. The position of each streamer indicates air flow.

Background of the invention

The invention, generally, relates to fluid flow measuring device and, more particularly, to a new and inexpensive fluid flow measuring device.

Visual indications of fluid flow (such as air flow) from a nozzle or duct have been obtained in the prior art by strips of wildly dancing material attached at the opening, but these strips tell only that air is flowing. Prior art air flow measuring devices are relatively expensive.

It is an object of the present invention to provide a fluid flow meter that is economical to manufacture and simple and reliable to operate.

A further object of the invention is to provide a rugged fluid flow meter that is not easily damaged by knocks and bumps occasioned in everyday use.

A still further object of the invention is to provide a simple fluid flow measuring device that is capable of presenting a velocity profile of fluid flow across a given area.

Summary of the invention

Breifly, a fluid flow meter constructred in accordance with the principles of the present invention has an enclosure with at least four surfaces defining a passageway having a substantially rectangular cross section. A tape biased at its bottom and of a suitable material such as Mylar for example, is supported at the top of the passageway to hang by gravity within the passageway. Preferably, at least one of the surfaces defining the passageway is transparent to facilitate observation of the position of the end of the streamer.

The above, and the other objects, advantages and features of the invention will become more readily apparent from the following detailed description of presently preferred embodiments thereof, which description is to be read in conjunction with the accompanying drawings forming a part hereof.

Brief description of the drawings

In the drawings:
FIGURE 1 is a fragmentary side view in cross section of an embodiment of a fluid flow meter illustrating the principles of the invention;
FIGURE 2 is a top view of a fluid flow meter having a plurality of passageways;
FIGURE 3 is a perspective view, partly in cross section, showing a further embodiment of the present invention.

Description of the preferred embodiments

Figure 4:
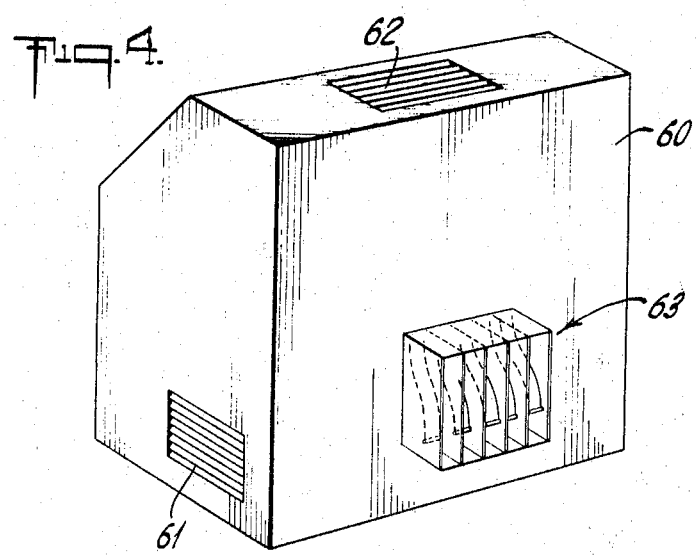
FIGURE 4 is a perspective view of a cabinet showing air flow openings with the meter of the present invention in operative relationship with one such opening.

Referring now to FIGURE 1, the numeral 10 identifies, generally, an enclosure having sides 11, a top 12, and a bottom 13. Preferably one of the sides 11 is transparent so that a tape 16 may be observed, which hangs limp or slack when no air is flowing and assumes some arcuate position, as indicated by broken lines 17 and 18, when fluid flows.

It will be understood that the arcuate positions 17 and 18, for example, represent two separate and distinct conditions of air flow. The tape 16 does not flutter and the position which it assumes is stable; for a greater air flow it assumes position 18 and for a less air flow, position 17.

An opening 19 in the front 15 of the enclosure is so formed that it does not produce appreciable turbulence. It is contemplated that the opening 19, or a plurality of such openings if the meter is formed with multiple passageways, will match closely the opening through which the air stream exits, usually as an exhaust from a cabinet.

The four surfaces provided by the two sides 11, the top 12 and the bottom 13 define a substantially rectangular passageway through the enclosure 10, and the streamer 16 is supported at the top of this passageway so that it hangs limp. While any suitable means may be used to secure the top of the streamer 16, such as an adhesive, a bar 20 is fastened by at least one screw 21 to the inside surface of the front 15 in the form of the invention shown in the drawings.

One material has been found to be entirely suitable as a tape 16 in that it is readily available, is economical and possesses a high degree of flexibility is Mylar. A tape about 0.5 inch wide and .001 to .002 inch thick has proved satisfactory.

The bottom of tape 16 is attached under a bar 22 fastened by at least one screw 23 to the inside surface of the front 15. The particular length of the streamer 16 is not critical, depending largely on the arcuate shape that may be desired and the velocity that may be expected under extreme conditions.

A plurality of lugs 24 extend from selected positions around the periphery of the front 15 to register with an opening with which the enclosure 10 is to be supported. In the drawings, the lugs 24 are shown with inwardly sloping edges permitting them to be inserted partially into an opening to hold and support the enclosure 10 by friction.

Calibrated marks, such as those marked by numerals "1" through "4," may be formed advantageously on one of the sides 11 to indicate the volume of air flowing through the meter.

In FIGURE 2, a meter indicated generally by the reference numeral 30 has a plurality of cells, or passageways, similar to that shown in FIGURE 1. By positioning this enclosure 30 in an air stream, an indication is presented of the velocity profile of the air across the stream. A plurality of openings 31 admit air to each of the several passageways 32 which are open at the back 33. An unbalanced condition of the air flow across the air stream may be observed readily by noting the positions of the respective tapes 34. The particular positions of the tapes indicate that the velocity of the air flow is greater toward the center of the air stream than it is at the edges. However, another factor is perceptible also, and that is the rate of change, or the gradient, of the air flow.

In FIGURE 3, two passageways 42 and 43 are defined primarily by surfaces 44, 45, 46; 47 and 44, 48, 46; 49, respectively. The two surfaces 45 and 49 are formed by opposite surfaces of a partition 50. The front 51 of the enclosure 40 has at least two openings 52 and 53, which admit air to the respective passageways 42 and 43, and the back 54 has corresponding exit openings 55 and 56.

A tape 57 is supported at the top of the passageway 42 by any suitable means, such as those mentioned in the description of FIGURE 1, so that it hangs across the cross section defined by the passageway. The particular streamer 57 is depicted as it would hang when no air is flowing through the opening 52; whereas a similar streamer 58 in the passageway 43 shows, generally, the position it will take when there is air flowing through the opening 53.

Unlike the attachment of the previously described streamers, such as shown in FIGURE 1, the streamers 57 and 58 are weighted or biased at the bottom ends by weights 59 and 60, respectively. The magnitudes of these weights 59 and 60 are selected to be just sufficient to maintain the bottom ends in a stable, downward direction.

While the structure that has been described is useful in a wide variety of environments, it is particularly useful in the adjustment of air inlet and exit openings in a cabinet housing heat producing electrical and electronic components to achieve a maximum efficiency in cooling air flow. Such a use is illustrated in FIGURE 4 of the drawings, wherein a cabinet 60 has a plurality of air flow entrances and exits 61 and 62, and one covered by meter 63 constructed in accordance with the principles of the present invention.

Figure 5:
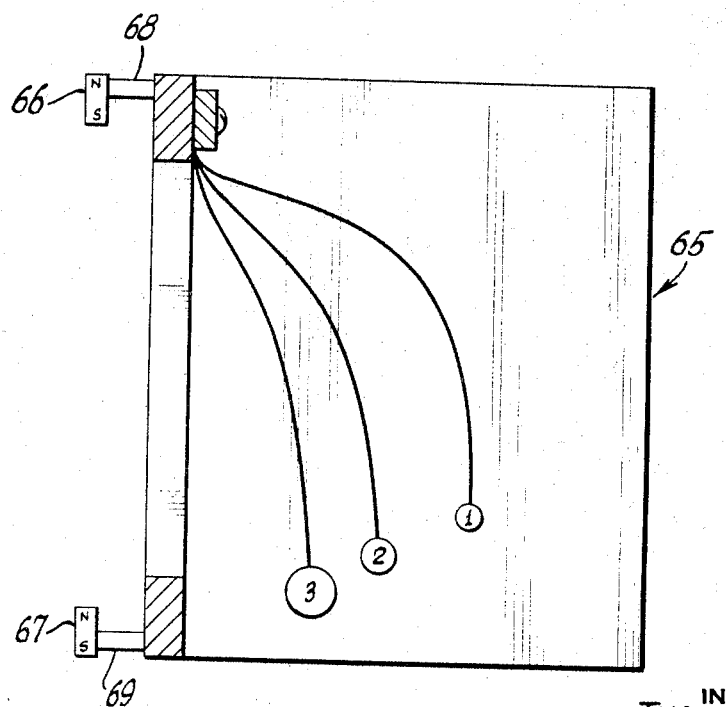
FIGURE 5 is a side view in cross section showing a still further embodiment of the present invention.

As mentioned previously, any suitable means may be used to support the meter over an air flow opening. FIGURE 5 shows an enclosure 65 with small magnets 66 and 67 attached to the enclosure 65 by suitable legs 68 and 69, so that the meter is readily supported against a metal cabinet. For a multiple passageway meter with only side surfaces transparent, it is convenient to attach distinctive objects to the bottom ends of respective tapes so that all streamers are easily identifiable. For example, these objects may be of different color or shape or both. It should be noted that all the objects conveniently have the same weight.

It is understood, of course, that other forms and modifications of the particular anemometer shown and described in the foregoing can be devised. It is, therefore, to be understood that all those modifications, as well as mechanical equivalents thereof, are intended to be read within the scope of the claims appended hereto.

What is claimed is:
1. A meter for indicating the velocity of an air flow, comprising:
   enclosure means having a passageway therethrough,
   a tape supported in said passageway at one end, and
   means for attching the other end of said tape to said enclosure so that said tape hangs in a slack loop when no air is flowing and forms a predetermined arc when air is flowing.
2. A meter for indicating the velocity of an air flow, comprising:
   an enclosure including a plurality of passageways therethrough,
   a tape supported at the top of each of said pluralities of said passageways, and
   means for biasing the other end of said tape.
3. A meter as set forth in claim 2 including means for attaching the bottoms of each of said streamers so that they hang in slack loops when no air is flowing and so that they form respective arcs when air is flowing.
4. A tape anemometer as set forth in claim 2 including weight means of different objects attached to the bottoms of said streamers so that they hang in predetermined arcs in an air flow.

References Cited
UNITED STATES PATENTS

| | | | |
|---|---|---|---|
| 2,735,300 | 2/1956 | Dungan et al. | 73—228 |
| 2,889,707 | 6/1959 | Snider | 73—189 X |
| 3,381,530 | 5/1968 | Lamb | 73—228 X |

RICHARD C. QUEISSER, *Primary Examiner*.

J. W. MYRACLE, *Assistant Examiner*.

U.S. Cl. X.R.

116—117